Oct. 31, 1933.  L. F. NENNINGER ET AL  1,932,984
MILLING MACHINE
Filed April 19, 1930
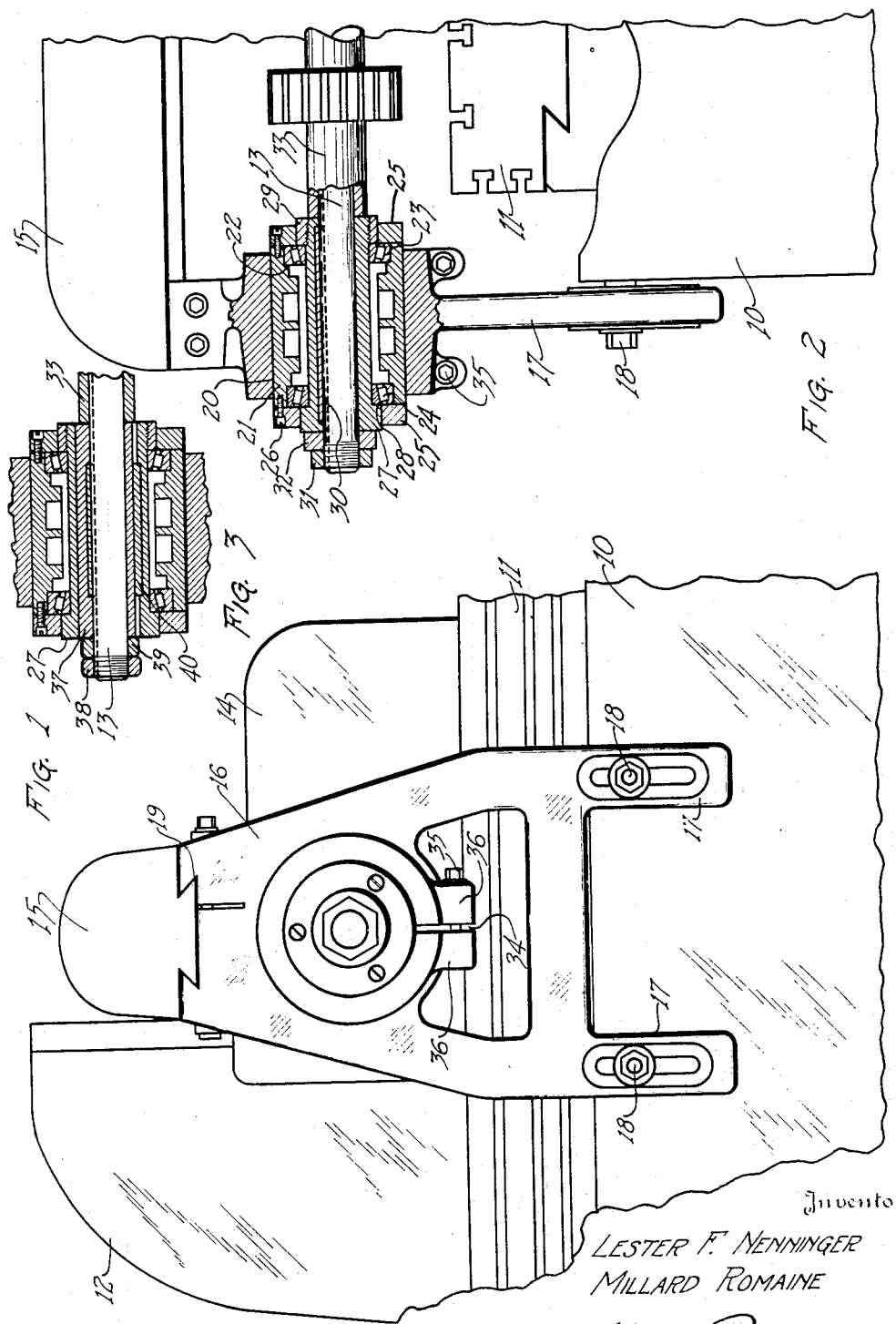
Inventor
LESTER F. NENNINGER
MILLARD ROMAINE
By  AHK Parsons
Attorney Patented Oct. 31, 1933

1,932,984

UNITED STATES PATENT OFFICE 1,932,984

MILLING MACHINE

Lester F. Nenninger and Millard Romaine, Cincinnati, Ohio, assignors to The Cincinnati Milling Machine Company, Cincinnati, Ohio, a corporation of Ohio Application April 19, 1930. Serial No. 445,753

7 Claims. (Cl. 90—18)

This invention relates to milling machines and more particularly to improvements in outboard supports for cutter arbors.

One of the objects of this invention is to provide an improved outboard support for the cutter arbors of milling machines that is more efficient in operation, enabling heavier cuts to be made and thereby increasing the productive possibilities of the machines.

Another object of this invention is to provide an improved anti-friction bearing for cutter arbors of milling machines that is capable of independent adjustment for position and wear.

A further object of this invention is to provide a unitary structure for supporting the outboard ends of both the overarm and the cutter arbor of a milling machine.

An additional object of this invention is to prevent wear on a journal bushing of a cutter arbor assembly of a milling machine by providing a false journal detachably splined to said bushing in the form of a rotor of an anti-friction bearing unit suitably supported on the machine whereby any wear will be absorbed by the relative rotating surfaces of the bearing unit.

Other objects and advantages of the present invention should be readily apparent by reference to the following specification considered in conjunction with the accompanying drawing illustrative of one embodiment thereof but it will be understood that any modifications may be made in the specific structural details hereinafter disclosed within the scope of the appended claims without departing from or exceeding the spirit of the invention.

Referring to the drawing in which like reference numerals indicate like parts:

Figure 1 is a front elevation of a machine showing one embodiment of the invention.

Figure 2 is a side elevation showing the arbor bearing in section.

Figure 3 shows a modified form of the invention.

In the drawing, one type of milling machine has been chosen for illustrative purposes but it will be understood that the improvements constituting this invention will be equally adaptable to other types of machines.

In this machine the reference numeral 10 indicates a support for the reciprocable work table 11, having column 12 associated therewith for supporting a cutter arbor 13 in cooperative relation with said table. In the present embodiment the cutter arbor 13 is adapted to be rotatably supported in the head 14 which is vertically adjustable on the column. An overarm 15 is also carried by the head 14, and is mounted for longitudinal adjustment with respect thereto. Thus the head 14, arbor 13 and overarm 15 are vertically movable as a unit with respect to the column.

An A-shaped frame 16 is provided for supporting the outboard ends of the overarm and arbor, having the legs 17 which are longitudinally slotted to receive the bolts 18, by means of which the frame is bolted to the bed 10, the slots permitting vertical adjustment of the frame with the overarm 15. Guide ways 19 are provided in the apex of the frame for receiving the overarm and permitting axial adjustment thereof.

The frame 16 is also provided with a bore 20, in which is slidably mounted the outer sleeve or barrel 21, having integrally formed in the interior thereof at each end the shoulders 22 forming annular recesses 23. A taper roller bearing 24 is mounted in each recess and held therein by the annular rings 25 which are fastened to the sleeve 21 by the screws 26. An inner sleeve 27 having a shoulder 28 formed on one end is journaled in the roller bearings and retained therein by the shoulder 28 engaging the inner race of one bearing and a collar 29 threaded on the other end of the sleeve engaging the inner race of the other bearing. A key 30 provides a driving connection between the arbor and the sleeve and at the same time permits relative longitudinal adjustment of the parts. The end of the arbor is threaded to receive the nut 31, which engages a collar 32 bearing against the sleeve 27 for forcing the sleeve longitudinally of the arbor into engagement with the last spacer 33 on the arbor.

Attention is invited to the fact that the outer race of the bearing is secured to the outer sleeve and the inner race of the bearing is secured to to the inner sleeve and therefore upon axial movement of the inner sleeve caused by nut 31, for instance, the outer sleeve will be moved also. This is necessary in order to clamp the inner sleeve against the last spacer on the bushing. In order to prevent creepage of the parts after this adjustment has been made, the outer sleeve is clamped in its adjusted position. In order to accomplish this, the frame is split as at 34 and bolts 35, passing through the lugs 36 and threaded in one of them, are provided for drawing the split bearing into clamping engagement with the outer sleeve. Since the inner races of the bearings are adapted to be adjusted toward one another by means of the shoulder 28 and the collar 29 of the sleeve 27 and since the outer sleeve may be clamped in various longitudinal positions, it will be seen that the bearing is capable of independent adjustment for both position and wear.

A modified form of the invention is shown in Figure 3 wherein the arbor 13 has splined thereon a journal bushing 37 mounted between the last spacer 33 and the collar 39 and held in place by the nut 38 engaging the collar. The inner sleeve or rotor 27 of the anti-friction bearing unit is adapted to receive the bushing and a spline 40 is provided between the parts to cause joint rotation thereof. It will be seen that the inner sleeve 27 acts as a false journal for the bushing 37 transferring the wear that usually takes place on the surface of said bushing in other types of arbor bearings to the anti-friction surfaces of the roller bearing.

Attention is also invited to the fact that the journal bushing is slightly larger in diameter than the adjacent spacer 33 or collar 39, which construction permits the bushing to float axially in the sleeve thereby allowing the arbor to expand during operation of the machine and preventing any cramping of the parts.

What is claimed is:

1. A brace for a milling machine comprising an A-shaped frame having means at the apex for attachment to an overarm, means therein for rotatably supporting a cutter arbor, including an outer sleeve longitudinally adjustable in the frame, an inner sleeve for receiving the arbor, taper bearing means for rotatably supporting the inner sleeve in the outer sleeve, said bearing coupling the sleeves for joint axial movement, means on the inner sleeve to adjust said taper bearings for wear, and means to clamp the outer sleeve after adjustment to the frame.

2. A device of the class described comprising an A-shaped frame having guides formed at the apex for attachment to the overarm of a milling machine, longitudinal slots formed in the legs of said frame for adjustable attachment to a fixed support, arbor bearing means in the frame comprising a bore having a tubular member slidably mounted therein, means for retaining anti-friction bearings in opposite ends thereof, a sleeve journaled in said bearings and held against longitudinal movement with respect thereto, means on the sleeve for axially adjusting said bearings to take up wear, and means to clamp the tubular member in adjusted positions in the bore whereby said arbor bearing may be independently adjusted for wear and for position.

3. In a milling machine having a support, an overarm projecting therefrom and a tool arbor projecting parallel to the overarm, the combination of means for journaling a portion of said arbor comprising an outer sleeve, means to support the sleeve from the overarm, an inner sleeve, anti-friction bearings journaling the inner sleeve in the outer sleeve, a bushing mounted in the inner sleeve for transmitting rotation of the arbor to the inner sleeve whereby the arbor, bushing and inner sleeve will rotate as a unit with respect to the outer sleeve, said bushing being longitudinally movable with the arbor and relative to the inner sleeve upon expansion of the arbor, and means to clamp the outer sleeve in fixed position relative to the overarm.

4. In a milling machine having a cutter arbor and an overarm mounted in spaced relation to the arbor, the combination of means for rotatably supporting the arbor from the overarm comprising a depending support longitudinally adjustable on the overarm, a bushing fixed to the arbor for rotational and axial movement therewith, a sleeve splined on said bushing and spaced anti-friction bearings carried by the support surrounding and rotatably supporting said sleeve against axial movement to maintain alignment of the arbor parallel to the overarm, but permitting longitudinal expansion of the arbor.

5. In a milling machine having a cutter arbor and an overarm mounted in spaced relation thereto, the combination of means for rotatably supporting the arbor parallel to the overarm comprising a pendant portion adapted to be adjustably mounted on the overarm, means to clamp the pendant in adjusted position, a bushing keyed to the arbor, a first sleeve splined on said bushing, an outer sleeve adjustably mounted in the pendant and carrying spaced anti-friction bearings surrounding and rotatably supporting the first named sleeve, said bushing being axially movable relative to the first sleeve to permit longitudinal expansion or contraction of the arbor while maintaining alignment thereof, and means to clamp the outer sleeve in adjusted position in said pendant.

6. In a milling machine having a spindle carrier and a cutter arbor journaled therein, the combination of means for rotatably supporting the free end of said arbor comprising a support member having an aperture therein, means to align the aperture with the axis of the arbor, said arbor having spacing collars for positioning a cutter axially thereof, a bearing structure adapted to be mounted in said aperture comprising an inner sleeve splined on the arbor for movement into engagement with the last spacing collar, an outer sleeve fitting said aperture, anti-friction bearings mounted in the opposite ends of the outer sleeve with the inner races thereof engaging the inner sleeve to prevent relative axial movement between the sleeves, means to clamp the inner sleeve against said collar and thereby axially position the outer sleeve in the support member, and means to clamp the outer sleeve in its adjusted position to the support member.

7. In a milling machine having a rotatable cutter arbor and bushings mounted thereon for axially positioning a cutter, the combination of means for supporting the free end of the arbor comprising an overarm, an arbor support member having a bore formed therein, means to attach the support member to the overarm with the bore in axial alignment with the arbor, means to journal the arbor in said bore comprising an outer sleeve slidably fitting said bore, an inner sleeve shiftable on the arbor into engagement with the last bushing thereon, tapered bearings coupling the sleeves for joint axial movement while permitting relative rotation therebetween, and means to clamp the outer sleeve to the support member to maintain the inner sleeve in adjusted position.

LESTER F. NENNINGER.
MILLARD ROMAINE.